United States Patent [19]

Punater

[11] Patent Number: 4,495,583

[45] Date of Patent: Jan. 22, 1985

[54] APPARATUS AND METHOD FOR ENCODING POSITIONS OF WEB PRESS MACHINES

[75] Inventor: Dinesh G. Punater, Dayton, Ohio

[73] Assignee: Harris Graphics Corporation, Melbourne, Fla.

[21] Appl. No.: 385,182

[22] Filed: Jun. 4, 1982

[51] Int. Cl.³ ........................ G06F 15/46; G06G 7/78

[52] U.S. Cl. .................................... 364/471; 364/469; 377/18; 101/248; 101/DIG. 12; 226/3; 226/9; 33/184.5

[58] Field of Search ........................ 364/471, 468, 469; 101/DIG. 12, 248; 33/184.5; 226/2, 3, 9, 45; 377/18, 24, 33

[56] References Cited

U.S. PATENT DOCUMENTS

| | | | |
|---|---|---|---|
| 1,998,711 | 4/1935 | Du Bois | 234/5.5 |
| 2,290,585 | 7/1942 | Gentry | 33/184.5 |
| 3,594,552 | 7/1971 | Adamson et al. | 377/18 |
| 3,701,464 | 10/1972 | Crum | 226/3 |
| 3,870,936 | 3/1975 | Coberley | 377/18 |
| 4,060,907 | 12/1977 | Van Hook | 33/184.5 |
| 4,135,664 | 1/1979 | Resh | 226/3 |
| 4,177,730 | 12/1979 | Schriber | 101/248 |
| 4,181,848 | 1/1980 | Iwase | 377/18 |
| 4,242,574 | 12/1980 | Grant | 235/92 |
| 4,243,925 | 1/1981 | Gnuechtel | 318/624 |
| 4,316,566 | 2/1982 | Arleth et al. | 226/2 |
| 4,318,176 | 3/1982 | Stratton et al. | 364/469 |

FOREIGN PATENT DOCUMENTS

| | | | |
|---|---|---|---|
| 1116728 | 1/1982 | Canada | 364/471 |
| 2083798 | 3/1982 | United Kingdom . | |

*Primary Examiner*—Jerry Smith
*Assistant Examiner*—John R. Lastova
*Attorney, Agent, or Firm*—Biebel, French & Nauman

[57] ABSTRACT

An apparatus and method for encoding the lateral or circumferential setting within a web press of a laterally or circumferentially adjustable machine for operating on a web is provided. The machine has an element which moves linearly as the machine is adjusted, and the apparatus includes a linkage connectable to the linearly moving element. An electric signal generator is operatively connected to the linkage for operation in response to movement of the linkage. A reference point is defined for describing the setting of the machine, and a code is computed in response to the signal generated by the signal generator for designating the setting of the machine with respect to the reference point. The generated code is then displayed in an appropriate manner or used to automatically set the machine.

15 Claims, 7 Drawing Figures

ENCODER
DIRECTION SENSOR
COUNTER
P.C.B. SWITCHES
MICROPROCESSOR
MULTIPLIER/ DIVIDER
MICRO-PROCESSOR AND MEMORY
FROM ENCODER 140 OR COMREHENSIVE MEASUREMENT SYSTEM
HALL EFFECT SWITCH 76
ENCODER OUTPUT SIGNALS
A
B
Z
0°
360°
(DEG)
M

APPARATUS AND METHOD FOR ENCODING POSITIONS OF WEB PRESS MACHINES

BACKGROUND OF THE INVENTION

This invention relates to apparatus for makeready adjustments to a web press such as is used in the manufacture of business forms. More particularly, the invention relates to an apparatus which encodes and displays the lateral or circumferential setting of machines within the web press that perform such operations as printing, numbering, perforating and the like.

Conventional web presses used in the manufacture of business forms combine a plurality of stations or towers housing various machines for offset printing, numbering, perforating and slitting the web. In setting up the press for a particular job, the press operator is confronted with a large number of time-consuming set-ups and adjustments in order to achieve proper registration of the various operations required to complete the printing of a form. For example, the plate and blanket cylinders of the press must be aligned in order to locate the printed images on the web, both laterally and circumferentially. Additionally, depending on the needs of the job and the complexity of the form, the press operator must align further apparatus such as an imprinter, numbering units and various devices used for punching and perforating the web.

Commonly assigned U.S. Pat. No. 4,177,730 discloses a total registration system for the different and optionally used machines of a business forms press in which the positional settings of the various press machines are related to common lateral and circumferential reference points so that many of the makeready adjustments can be made in a static mode without running the press. Usually, these lateral and circumferential adjustments are made using indicating and adjustment mechanisms such as a transverse positioning bar or a standard hand wheel and micrometer dial arrangement.

The transverse guide bar with a graduated scale is frequently employed, for example, for locating the attachment of a patch locator plate in an imprint station, or with numbering units to laterally position the numbering machine with respect to the web. Hand wheel and dial assemblies are conventionally used to laterally and circumferentially adjust the position of offset plate and blanket cylinders with respect to the web path. These adjustment mechanisms were developed quite early in the trade and can provide a high degree of accuracy when used by a skilled press operator. Their principal drawback, however, is that the press elements must be visually adjusted and aligned and, therefore, they are not adaptable to automatic setting operations. Furthermore, the most accurate positional settings are only obtained by carefully positioning the machine elements with respect to the indicator or scale. Each of these adjustments, therefore, requires time and the time required for the totality of adjustments typically exceeds the time required to make a run.

Thus, there is a need for an apparatus that simplifies and speeds web press adjustments, and that can interface with an automatic or semi-automatic makeready adjustment system.

SUMMARY OF THE INVENTION

The present invention provides an apparatus for encoding the lateral or circumferential setting within a web press of a laterally or circumferentially adjustable machine for operating on a web. The machine includes an element which moves linearly as the machine is adjusted.

The apparatus includes a linkage connectable to the linearly moving element of the machine. An electric signal generator is operatively connected to the linkage for operation in response to movement of the linkage. A reference point is defined for describing the setting of the machine, and a code is computed in response to the signal generated by the signal generator for designating the setting of the machine with respect to the reference point. The generated code is then displayed in an appropriate manner.

The electric signal generator may be a shaft angle position encoder, wherein the movement of the linkage rotates the drive shaft of the encoder, so as to generate the electric signal. The linkage is a timing belt, and engages the shaft of the encoder. The reference point is defined by including a switch which is sensitive to an indicator mounted to the linkage.

The present invention further includes a method for adjusting to a predetermined setting the lateral or circumferential setting within a web press of a laterally or circumferentially adjustable machine for operating on a web. The machine is provided with an element which moves linearly as the machine is adjusted. The method includes the steps of defining a reference point for describing the setting of the machine, and aligning the machine so that a linkage may be extended to and connected with the linearly moving element. An electric signal is generated in response to extension of the linkage, and a code is computed in reponse to generation of the signal. The code is then used for designating the setting of the machine with respect to the reference point.

In some cases, the linkage may be permanently connected to the linearly moving element, in which case no alignment of the machine is required.

The computed code is then compared with a predetermined code corresponding to the predetermined setting to which the machine is to be adjusted. The machine is adjusted in response to this comparison, whereby the linearly moving element is moved, moving the linkage. An electric signal is again generated in response to movement of the linkage, and the code is recomputed in response to the generation of the signal for designating the adjusted setting of the machine with respect to the reference point. The recomputed code is compared with the predetermined code, and in the event the recomputed code differs from the predetermined code, the machine is adjusted again.

Accordingly, it is an object of the present invention to provide an apparatus and method which assists the press operator in making lateral and circumferential adjustments of various machines acting on the web in a web press; to provide an apparatus and method which encodes the operative position of a web press machine with respect to a reference position, thereby being adaptable to automatic and semi-automatic adjustment operations; to provide an apparatus which reduces the makeready adjustment time; to provide an apparatus which displays an encoded positional setting of a press machine; and to provide a method for performing makeready adjustments using the aforesaid apparatus.

Other objects and advantages of the invention will be apparent from the following description, the accompanying drawings and the appended claims.

DETAILED DESCRIPTION OF THE PREFERRED EMBODIMENTS

Figure 1:
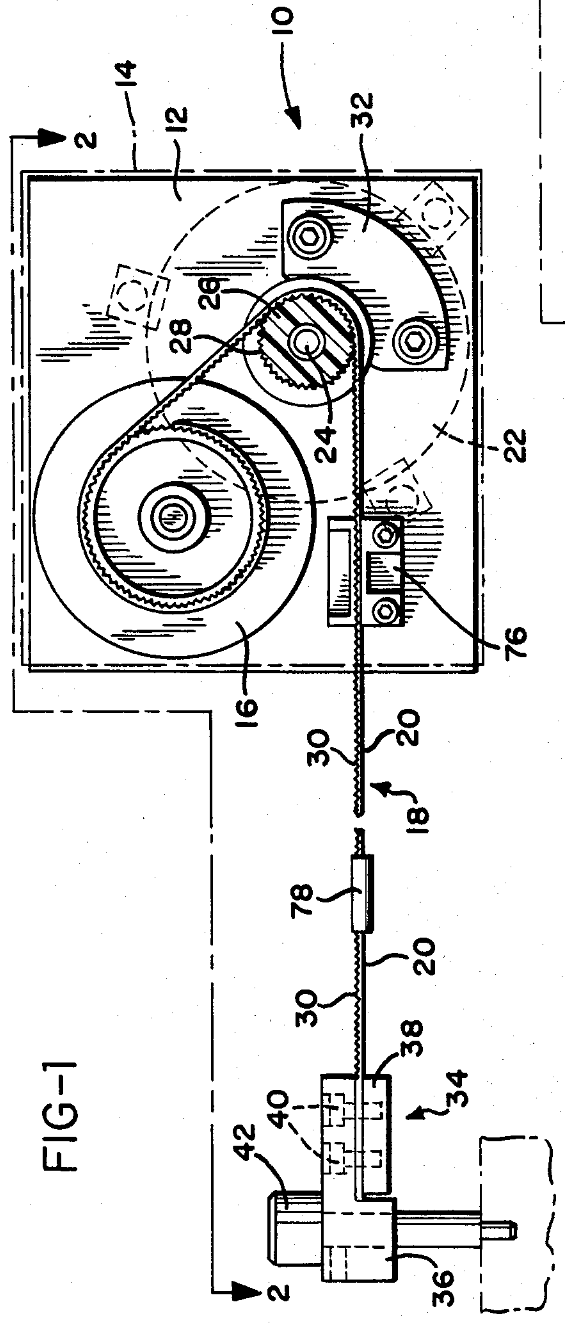
FIG. 1 is an elevational view of the encoding apparatus of the present invention showing the housing removed.
Figure 2:
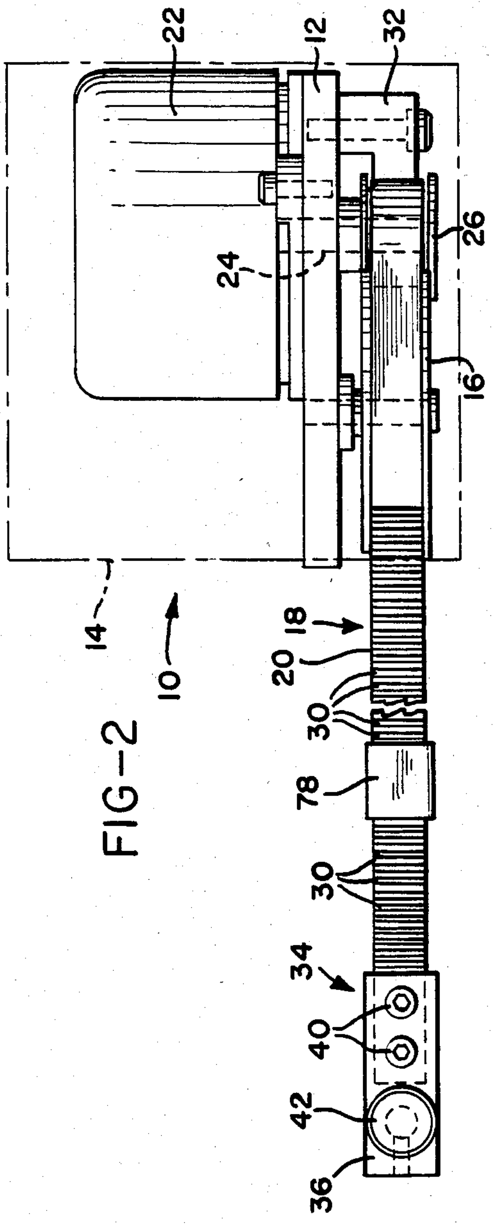
FIG. 2 is a view taken generally along line 2—2 of FIG. 1.

Referring now to the drawings, and in particular to FIGS. 1 and 2, the apparatus 10 of the present invention includes a support plate 12 mounted within a housing 14. A spring mounted reel 16 is mounted to one side of plate 12, and pays out and retrieves a linkage 18 in the form of timing belt 20.

An encoder 22 is mounted to plate 12 on the side thereof opposite reel 16. Encoder 22 includes a shaft 24 extending through plate 12 to which a toothed pulley 26 is attached. Pulley 26 includes a plurality of teeth 28, which are adapted to cooperate with a plurality of cogs 30 disposed along one side of timing belt 20. A guide piece 32 is mounted to plate 12, located adjacent the portion of pulley 26 along which belt 20 is passed. Guide 32 serves to facilitate retention of timing belt 20 on pulley 26.

A belt clamp 34 is attached to the leading end of timing belt 20. Clamp 34 includes an upper portion 36 and a lower portion 38, joined together by bolts 40. A locating pin 42 is mounted through upper portion 36 of belt clamp 34. Besides providing for mounting of locating pin 42, belt clamp 34 also serves to prevent the timing belt 20 from being totally withdrawn into the interior of housing 14 by spring reel 16. Thus, the opening through which belt 20 emerges from housing 14 is accordingly adapted so that belt clamp 34 serves as a stop for belt 20, and defines for locating pin 42 what is hereinafter referred to as its "home position".

The encoder 22 utilized by the preferred embodiment of the present invention is a shaft-angle positional encoder. Encoder 22 generates a plurality of electrical signals in response to rotation of its shaft 24 by movement of linkage 18, which in the apparatus 10 is performed by movement of timing belt 20 in either direction along pulley 26.

Figures 3, 4, 5, 7:
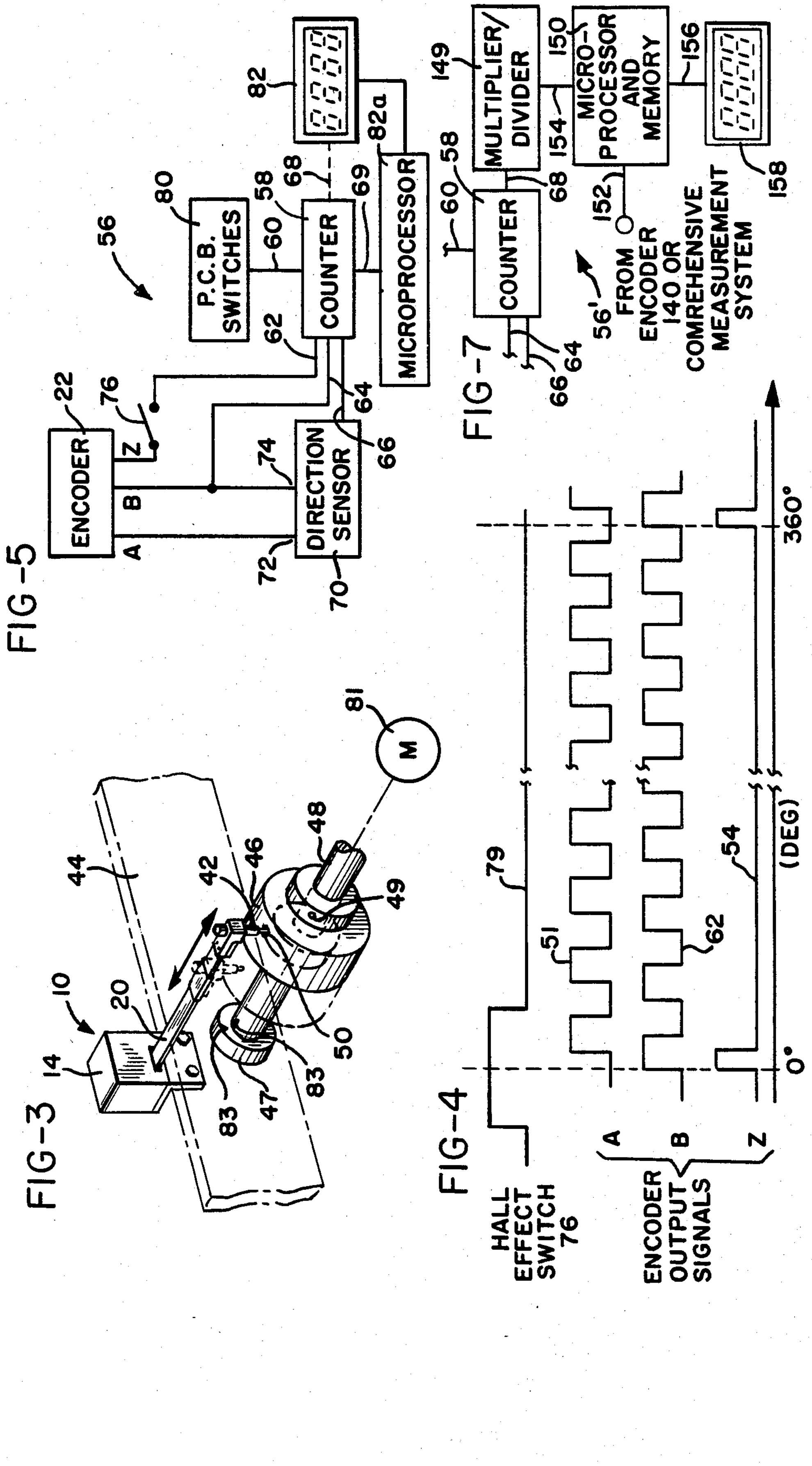
FIG. 3 is a perspective view showing the encoding apparatus for use in encoding the lateral setting of a laterally adjustable machine.
FIG. 4 is a graphic illustration of the signals produced by the encoder and the operation of the Hall effect switch.
FIG. 5 is a view showing schematically the circuit for generation and display of the code from the signals produced by the encoder.
FIG. 7 is a view of a portion of the circuit of FIG. 5, showing modifications for use in encoding circumferential settings.

The remainder of the apparatus 10 can be best understood by considering its use for encoding the lateral setting within a web press of a laterally adjustable machine for operating on a web, shown generally in FIG. 3. The apparatus 10 is mounted to a side frame 44 or other stationary member of a web press, adjacent the laterally adjustable machine 46 with which the apparatus 10 is to be used. Machine 46 may be any laterally adjustable machine for operating on a web, such as an imprinter, numbering unit, or a device for punching or perforating the web, and is mounted to a shaft 48 extending between side frame 44 and the opposite side (not shown) of the press. Shaft 48 is journalled for rotation within bearing housing 47 mounted in side frame 44, and is coupled to an appropriate drive train (not shown). Machine 46 is movable along shaft 48 to a desired setting or position, and may be secured in place once in that position, such as by tightening set screw 49.

Alternatively, it can be seen that the apparatus 10 may be mounted by connection to the housing whereby shaft 48 is supported by side frame 44, since the lateral position of machine 46 may be expressed either in terms of distance from side frame 44 or distance along shaft 48.

Machine 46 includes a hole 50 along its outer surface into which locating pin 42 is fittable, so that linkage 18 is selectively connectable and disconnectable from machine 46. In using the encoding apparatus 10, locating pin 42 is extended from its home position and is inserted into the hole in machine 46. As locating pin 42 is moved, timing belt 20 is extended from housing 14, thereby passing along and rotating pulley 26, and thus, shaft 24 of encoder 22.

In the preferred embodiment, encoder 22 is preferably a model Rs 23 encoder manufactered by Data Technology, Inc. Three different output signals are produced by encoder 22 in response to rotation of its shaft 24, hereinafter referred to as the A, B and Z signals. A diagram of each of these signals is presented in FIG. 4. Signals A and B, shown at 51 and 52, respectively, each constitute similar square waves, with signal B leading signal A by one-quarter of a phase in the forward direction as shown in FIG. 4, with each signal including 224 pulses per revolution (360°) of the encoder shaft 24. The Z signal, which also produces a square-shaped pulse, functions as a marker and is produced once per revolution of encoder shaft 24, indicated at 54. Additionally, encoder 22 includes appropriate terminals (not shown) for attachment thereto of a +5 VDC power supply (not shown).

A schematic diagram illustrating the processing of the signals produced by encoder 22 is presented as logic circuit 56 in FIG. 5. Circuit 56 is centered around an appropriate counter 58, having four inputs 60, 62, 64, and 66, and outputs 68 and 69. The "count" signal is applied to counter 58 through input 64, and is the signal B square wave supplied directly from encoder 22. Counter 58 generates and maintains a code corresponding to an accumulative total of counts, and the counts from signal B supplied at input 64 is either substracted or added to the total, depending upon the direction of rotation of the encoder shaft 24.

Whether the counts are to be added to or substracted from the total maintained by counter 58 is determined by direction sensor 70. Both signals A and B from encoder 22 are supplied to direction sensor 70, signal A at input 72, and signal B at input 74. Because signals A and B are separated by a one-quarter phase difference, direction sensor 70 is operative to determine which signal, A or B, is leading the other by one-quarter phase in order to determine the direction of rotation of encoder shaft 24. By referring back to FIG. 4, it will be recognized that in the event signal B leads signal A by one-quarter of a phase, the encoder shaft 24 is being rotated in the forward direction as shown therein. Similarly, in the event that signal B leads signal A, the encoder shaft 24 is being rotated in the reverse direction. Following this determination within direction sensor 70, an appropriate signal is supplied to counter 58 at input 66, instructing the counter 58 whether the count signals supplied at input 64 should be added or substracted to the accumulated total therein.

The Z signal produced once every revolution of encoder shaft 24 by encoder 22 is useful in logic circuit 56 for indicating to counter 58 the location of a reference point at which counting begins. It will be seen, however, that depending upon the particular application of the encoder apparatus 10, extension of the timing belt 20 therefrom may be such that encoder shaft 24 completes more than one revolution. To prevent the counter 58 from being restarted each time a subsequent pulse is produced at the Z signal output, a switch 76 is provided between the Z signal output of encoder 22 and input 62 to counter 58.

Referring back to FIG. 1, the location of switch 76 within the encoder apparatus 10 may be seen. Switch 76 is mounted to support plate 12 so as to be adjacent to timing belt 20 as it passes in or out of the housing 14. Switch 76 is a Hall effect switch sensitive to an indicator means in the form of metal tab 78 mounted to the timing belt 20. Switch 76 is adapted to be closed only when tab 78 is located immmediately adjacent switch 76, and tab 78 is located along timing belt 20 so as to pass by switch 76 shortly after locating pin 42 is extended from its home position. Moreover, encoder 22 is adjusted so as to be in the position labeled "0°" in FIG. 4 when switch 76 is closed, indicated in FIG. 4 at 79, so that the Z signal pulse is produced and supplied to counter 58 through closed switch 76 and input 62. Accordingly, just after locating pin 42 is extended from its home position, an initial starting-point (corresponding to 0° in FIG. 4) is supplied to counter 58, from which the generated count signals are substracted or added. In the event the encoder shaft 24 completes a full revolution, the second Z signal pulse produced will not be supplied to counter 58, because at that point switch 76 will be open.

Depending upon the particular application of the encoder apparatus 10, it may be desirable to supply counter 58 with an initial, zero or non-zero count total that may be adjusted according to particular situations. Thus, appropriate printed circuit board switches 80 are supplied, connected to counter input 60, switches 80 being adjustable to provide any desirable initial count to counter 58. The initial count provided by switches 80 is loaded into counter 58 through input 60 upon receipt by counter 58 of the initializing Z signal pulse provided by encoder 22.

The code representing the accumulated total maintained within counter 58 is supplied through counter output 68 to an appropriate display means 82 located on a control panel (not shown) or, more preferably, is supplied through counter output 69 to a microprocessor 82*a* which in turn drives display means 82. In the preferred embodiment, display means 82 includes a plurality of 7-unit digital displays, and the display may be made in a continuous or selective fashion, as may be desired. It will be recognized, of course, that any other appropriate visual display means may be used, and in addition, the code provided at output 69 of counter 58 may be used in conjunction with microprocessor 82*a* to make automatic makeready adjustments to the web press machine.

The method of using the encoder apparatus 10 and the associated circuit 56 for making adjustments to a laterally adjustable machine 46 should be apparent from the description of the apparatus 10 and circuit 56 just presented. Initially, locating pin 42 is in its home position, and when locating pin 42 is extended from the home position, an initializing signal is provided as the Z signal to the counter 58, causing the initial total as determined by switches 80 to be loaded into counter 58. The operator of the apparatus 10 moves the locating pin 42 and inserts it into the hole 50 provided in the machine 46, thereby extending timing belt 20 and rotating encoder shaft 24. Signals A and B are generated, and the appropriate number of counts is either added to or substracted from the total contained in counter 58. The accumulated total is displayed by the display means 82. The operator, by referring to a predetermined display value corresponding to the desired setting or location for machine 46, adjusts the position of machine 46 along its support shaft 48. Movement of machine 46 also moves timing belt 20, rotating encoder shaft 24, thereby updating the displayed value. When the display shown on the display means 82 matches the predetermined value, the machine 46 is properly adjusted and is secured to the shaft 48. Locating pin 42 is then removed from machine 46, and is returned to its home position, where upon the timing belt 20 is retracted onto spring reel 16.

It may be desirable to provide an appropriate lockout circuit (not shown), to prevent the operation of the web press, including machine 46, until and unless locating pin 42 has been returned to its home position.

It will be recognized that prior to lateral positional adjustment of machine 46, the machine 46 must be brought to a rotational position wherein hole 50 is aligned so that belt 20 may be extended along a line parallel to shaft 48. Otherwise, the extension path for belt 20 will be effectively lengthened, and the position encoded by apparatus 10 will not precisely correspond to the true position of machine 46. Additionally, as an aid to the operator, set screw 49 is located along machine 46 so as to be accessible when hole 50 is properly aligned.

Accordingly, a stepper motor 81 is operatively connected to shaft 48 for providing the proper pre-encoding alignment. The motor 81 rotates shaft 48 through a harmonic differential (not shown) that is part of the primary drive train connection for rotating shaft 48 having a secondary input to which the motor 81 is connected. When the web press is stopped for lateral adjustment, the stepper motor 81 may be actuated to rotate shaft 48 in either direction as necessary to align hole 50 in machine 46 for insertion of locating pin 42. To aid proper alignment, a pointer and indicator pair 83 are provided on housing 47 and shaft 48 so that actuation of the stepper motor 81 may be stopped once the appropriate alignment has been achieved.

In the alternative, operation of the stepper motor for alignment of machine 46 for lateral position encoding may be performed automatically. In such a case, the control for motor 81 may be through microprocessor 82*a* that is further adapted to be responsive to the rotational position of machine 46. Upon stopping the web press for position encoding, the microprocessor 82*a* causes the stepper motor 81 to rotate shaft 48 so that hole 50 and set screw 49 are properly aligned.

Figure 6:
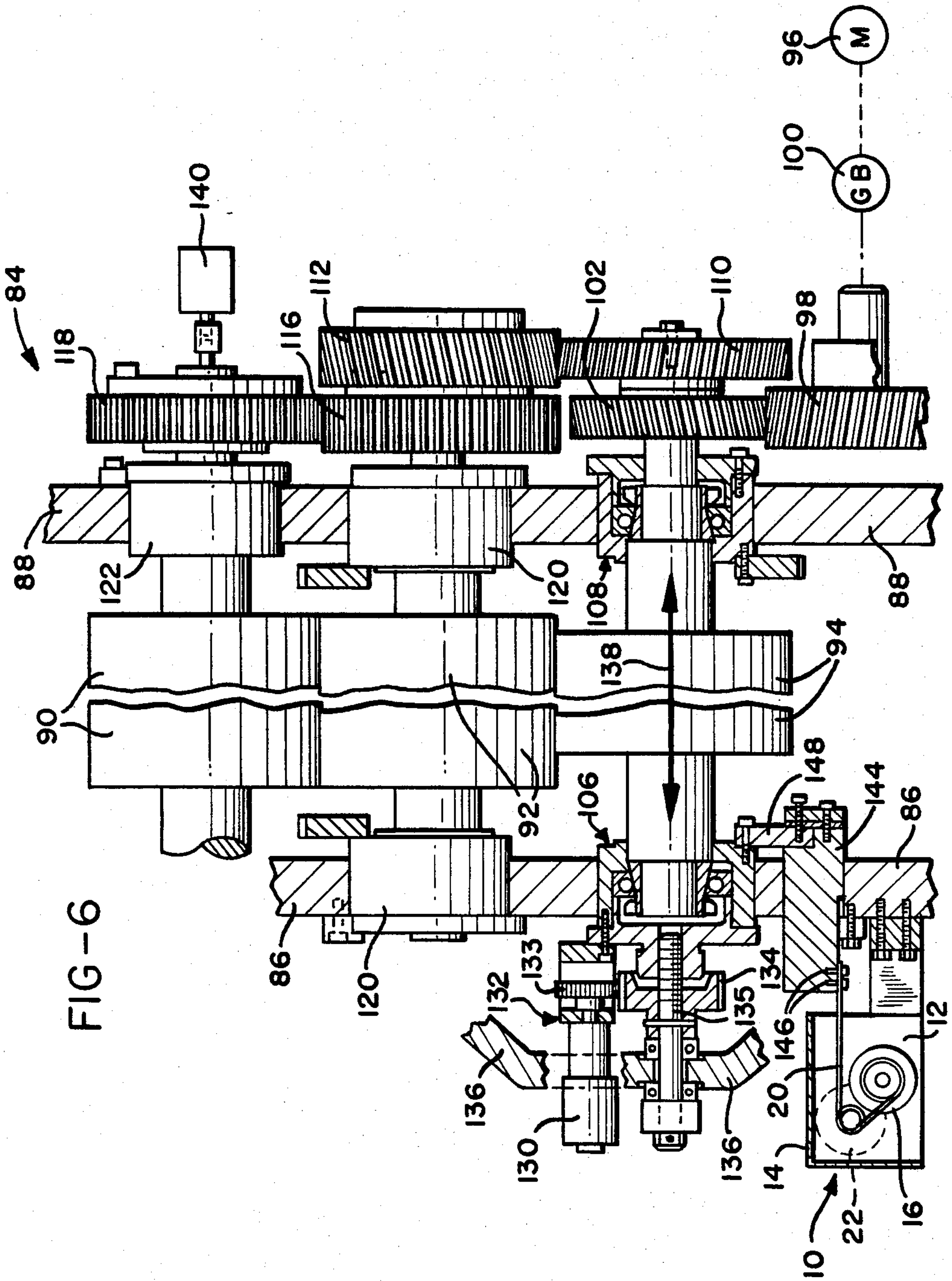
FIG. 6 is a view showing a portion of a web press, illustrating use of the apparatus for encoding the circumferential setting of a circumferentially adjustable machine.

The operation of the encoder apparatus 10 and associated circuit 56 for encoding the circumferential setting of a circumferentially adjustable machine may be seen by referring to FIG. 6. A portion of a web press 84 is shown, in which side frames 86 and 88 support a plurality of cylinders, including plate cylinder 90, blanket cylinder 92 and impression cylinder 94. A main drive motor 96 drives a helical gear 98 through gear box 100, which in turn drives helical gear 102, rotating impression cylinder 94. Cylinder 94 is supported near each end thereof by bearing housings 106 and 108, each in turn supported by side frames 86 and 88, respectively. Both bearing housings 106 and 108 are laterally slideable within side frames 86 and 88.

A helical gear 110 is mounted to cylinder 94 at one end thereof adjacent helical gear 102. Gear 110 engages and drives helical gear 112, mounted to one end of blanket cylinder 92. A spur gear 116 is also mounted to cylinder 92 adjacent gear 112, which engages and drives a similar gear 118, attached to one end of plate cylinder 90. Accordingly, motor 96, through gear box 100 and helical gear 98, rotates each of the cylinders 94, 92 and 90.

Cylinder 92 is supported near each end thereof by a bearing housing 120. Bearing housings 120 are in turn mounted to either side frame 86 or 88, although bearing housings 120, unlike housings 106 and 108, are not laterally moveable within side frames 86 and 88.

Cylinder 90 is similarly supported by a pair of bearing housings 122. Housings 122 are laterally movable within side frames 86 and 88, however, so that lateral adjustment of plate cylinder 90 may be made with respect to blanket cylinder 92 by appropriate apparatus (not shown).

In operating the web press 84, it is necessary for the printing of the web performed by cylinders 90 and 92 to correspond with various other operations, such as perforating, numbering, and the like, also performed on the web by web press 84. Thus, it is occasionally necessary to adjust the circumferential setting of the plate cylinder 90 and blanket cylinder 92. Such an adjustment may be made either while the web press 84 is running, or while the press 84 is stopped thereby avoiding waste of paper while the adjustment is made. In this regard, the encoder apparatus 10 and its associated circuit 56 may be used, in conjunction with apparatus included within the web press 84 for making trim adjustments, i.e., adjustments within a circumferential range of $\frac{1}{4}$ inch off cylinders 90 and 92, for providing a display of the circumferential setting of the cylinders 90 and 92 as adjustments are made.

The apparatus for making the adjustments includes a trim motor 130, connected to a supporting structure 132 mounted to bearing housing 106. Trim motor 130 drives gear 133 which engages and drives gear 134 mounted to a screw shaft 135. Shaft 135 is threadingly engaged at one end with housing 106, and is mounted for rotation at the other end to a bracket 136. Bracket 136 is fixedly mounted to side frame 86 of press 84 (mounting not shown).

The operation of the trim adjustment apparatus is described as follows. In the event trim adjustment of the circumferential setting of cylinders 90 and 92 is necessary, trim motor 130 is energized for an appropriate time period. Motor 130 drives gear 133, which in turn drives gear 134. Screw shaft 135 is rotated, and depending upon the direction of rotation, pulls or pushes bearing housing 106 laterally within side frame 86. Lateral movement of housing 106 results in similar movement of cylinder 94, indicated by arrow 138.

Lateral movement of cylinder 94 in turn causes similar movement of gear 102 along gear 98 and of gear 110 along gear 112. Since gears 98 and 102 are helical gears, however, the lateral movement causes the circumferential position of gear 102 with respect to gear 98 to be shifted as well. In similar fashion, interaction between gears 110 and 112 causes the relative circumferential position therebetween to be shifted. Thus, the effect of the lateral shifting of impression cylinder 94 on the circumferential setting of the plate and blanket cylinders with respect to gear 98 is doubled.

It will be recognized that operation of the apparatus for making circumferential adjustments may be used both when press 84 is being run and when it is stopped.

When web press 84 is stopped, gross adjustments to the circumferential setting or position of cylinders 90 and 92 with respect to gear 98 may be made by disengaging a clutch 142 operative between gears 112 and 116, whereby cylinders 90 and 2 may be rotated independently of rotation of cylinder 94. The adjustments are encoded by an encoder 140 coupled directly to plate cylinder 90. Encoder 140 is similar in construction and operation, and may be identical to encoder 22 used with the encoder apparatus 10. The positional code generated by encoder 140 and its associated signal processing circuit (not shown), is supplied to and retained within an appropriate memory circuit, which may be part of a larger comprehensive measurement system for determining the relative circumferential settings of all the rotary machines of web press 84. Details of the construction and operation of such a measurement system may be seen by reference to commonly assigned, copending U.S. patent application to Punater et al, "Apparatus and Method for Measuring Rotational Position", Ser. No. 385209, filed June 4, 1984.

Each of the gears used in driving cylinders 90, 92 and 94 from gearbox 100, i.e., gears 98, 102, 110, 112, 116 and 118, possesses a certain amount of backlash or play as it meshes with adjacent gears. When web press 84 is being run, all of the gears are under load, and the backlash has no effect on the relative circumferential positions of cylinders 90, 92 and 94. When web press 84 is stopped, however, as is the case for making gross adjustments with clutch 142 disengaged, the backlash can account for as much as $\frac{1}{8}$-inch variation in the relative circumferential positions of cylinders 90 and 94. Thus, trim adjustments made by trim motor 130 may not immediately adjust the setting of cylinder 90 the full amount desired, since part of the adjustment may be taken up by the backlash. Once web press 84 is restarted, however, the adjustment made to the circumferential setting of cylinder 94 is transferred in its entirety to cylinder 90 as the intervening gears are brought under load.

The foregoing discussion illustrates that merely relying upon the code generated by encoder 140 is insufficient for showing accurately the trim adjustments made to the circumferential setting of cylinders 90 and 92 while web press 84 is stopped. Accordingly, trim adjustments to the circumferential setting of cylinders 90 and 92 must be encoded directly from adjustments made to cylinder 94, and may be encoded through use of encoder apparatus 10 and its associated circuit 56.

The encoder apparatus 10 is fixedly mounted to side frame 86 of web press 84. Rather than having a locating pin attached to the leading end of timing belt 20, the end of the belt 20 is permanently attached to a block 144 by screws 146. Block 144 is supported by side frame 86, but is mounted so as to be slideable through side frame 86. A connecting member 148 is attached to block 144 and is also connected to bearing housing 106.

During operation of trim motor 130, causing cylinder 94 to be moved laterally, housing 106 is moved laterally within side frame 86, thereby moving connecting memeber 148 and block 144 through the same distance in the same direction. Timing belt 20 of the encoder apparatus 10 is consequently extended from or retracted into the apparatus 10, rotating the shaft 24 of encoder 22. The signals generated by encoder 22 are supplied to circuit 56', shown in FIG. 5 with modifications indicated by FIG. 7, which generates a code corresponding to an accumulated number of generated counts at output 68 of counter 58. Since lateral movement of cylinder 94 is directly proportional to circumferential adjustment of cylinders 90 and 92, the code provided at output 68 in response to lateral movement of cylinder 94 corresponds to the circumferential adjustment. Depending upon the particular helical gears 98 and 102 used, however, it may be necessary to supply the generated code to an appropriate multiplier or divider 149 to multiply or divide the code by an appropriate constant, so that equal increments of the codes generated by apparatus 10 and by encoder 140 correspond to equal increments of circumferential setting of the cylinders 90 and 92.

It will be noted from FIG. 6 that apparatus 10 when used for encoding circumferential settings need not include switch 76. In such usage, the distance belt 20 is extended is sufficiently short that encoder 22 will not complete even one full rotation. Thus, there is no need for using the Z signal pulses provided by encoder 22, as well as the input 62 to counter 58.

Unlike the case of linear adjustments, the code generated by circuit 56' does not represent the actual circumferential setting of cylinders 90 and 92, but rather trim adjustment to the gross adjustment measured by encoder 140, and perhaps, an adjustment to an overall relative circumferential positional measurement system. As shown in FIG. 7, then, the code generated by encoder 140 or by the comprehensive measurement system is supplied to a microprocessor and memory circuit 150 at input 152, as is the code provided at output 68 of counter 58, modified by multiplier/divider 149, at input 154. The code supplied at input 152 effectively serves as the reference for describing the setting of the cylinders as determined by the apparatus 10. Within microprocessor and memory circuit 150, the code generated by the apparatus 10 is added to or subtracted from, as is appropriate, the code corresponding to the gross setting of cylinders 90 and 92 supplied by input 152. The combined code is then provided, at output 156, to an appropriate display means 158, shown in FIG. 7 perferably as a plurality of 7-unit digital displays. As is the case in linear machine settings, the code supplied at ouput 156 may also be used to make automatic makeready adjustments to web press 84.

The method of using the encoder apparatus 10 for making circumferential trim adjustments is essentially the same as that described for making linear adjustments. The operator of the web press 84 activates trim motor 130 in either direction, as necessary, until the display shown on the display means 158 matches a predetermined display corresponding to the desired circumferential setting of cylinder 90 and 92.

While the methods and forms of apparatus herein described constitute preferred embodiments of this invention, it is to be understood that the invention is not limited to these precise methods and forms of apparatus, and that changes may be made in either without departing from the scope of the invention, which is defined in the appended claims.

What is claimed is:

1. An apparatus for encoding a lateral or circumferential setting within a web press of a laterally or circumferentially adjustable machine for operating on a web, said machine having an element which moves linearly as said machine is adjusted, comprising:

a linkage connectable to said linearly moving element for linear movement therewith;

means for generating an electric signal operatively connected to said linkage for operation in response to linear movement of said linkage;

means defining a reference point for describing the setting of said machine; and means for computing a code in response to said signal generated by said signal generating means for designating the setting of said machine with respect to said reference point.

2. The apparatus as defined in claim 1 further comprising means for displaying said code.

3. The apparatus as defined in claim 1 wherein said means for generating an electric signal is a shaft angle position encoder.

4. The apparatus as defined in claim 3 wherein movement of said linkage rotates a drive shaft of said encoder.

5. The apparatus as defined in claim 4 wherein said linkage is a timing belt, and further comprising means for engaging said timing belt with said shaft of said encoder.

6. The apparatus as defined in claim 1 further comprising means for selectively disconnecting and connecting said linkage and said linearly moving element.

7. The apparatus as defined in claim 1 wherein said means defining a reference point includes a Hall effect switch that is sensitive to an indicator on said linkage.

8. A method for encoding a lateral or circumferential setting within a web press of a laterally or circumferentially adjustable machine for operating on a web, said machine having an element which moves linearly as said machine is adjusted, comprising the steps of:

defining a reference point for describing the setting of said machine;

extending linearly a linkage to and connecting said linkage with said linearly moving element;

generating an electric signal in response to extension of said linkage and to subsequent linear movement of said linkage by moving of said element; and computing a code in response to generation of said signal for designating the setting of said machine with respect to said reference point.

9. The method as defined in claim 8 further comprising the step of displaying said code.

10. The method as defined in claim 8 further comprising the step of moving said machine in a rotational direction to align said machine for connection with said linkage.

11. The method as defined in claim 8 further comprising the step of displaying said code.

12. A method for encoding a lateral or circumferential setting with a web press of a laterally or circumferentially adjustable machine for operating on a web, said machine having an element which moves linearly as said machine is adjusted, comprising the steps of:

defining a reference point for describing the setting of said machine;

providing a linkage connected with said linearly moving element for linear movement therewith;

generating an electric signal in response to linear movement of said linkage by moving of said element; and computing a code in response to generation of said signal for designating the setting of said machine with respect to said reference point.

13. A method for adjusting to a predetermined setting a lateral or circumferential setting within a web press of a laterally or circumferentially adjustable machine for operating on a web, said machine having an element which moves linearly as said machine is adjusted, comprising the steps of:

(a) defining a reference point for describing the setting of said machine;

(b) extending linearly a linkage to and connecting said linkage with said linearly moving element;

(c) generating an electric signal in response to extension of said linkage;

(d) computing a code in response to generation of said signal for designating the setting of said machine with respect to said reference point;

(e) comparing said computed code with a predetermined code corresponding to said predetermined setting to which said machine is to be adjusted;

(f) adjusting said machine whereby said linearly moving element is moved, moving said linkage linearly therewith;

(g) generating an electric signal in response to movement of said linkage;

(h) recomputing said computed code in response to generation of said signal for designating an adjusted setting of said machine with respect to said reference point;

(i) comparing said recomputed code with said predetermined code; and (j) if said recomputed code differs from said predetermined code, repeating steps (f) through (i).

14. The method as defined in claim 13 further comprising the step of moving said machine in a rotational direction to align said linearly moving element for connection with said linkage.

15. A method for adjusting to a predetermined setting a lateral or circumferential setting within a web press of a laterally or circumferentially adjustable machine for operating on a web, said machine having an element which moves linearly as said machine is adjusted, comprising the steps of:

(a) defining a reference point for describing the setting of said machine;

(b) providing a linkage connected with said linearly moving element for linear movement therewith;

(c) generating an electric signal in response to extension of said linkage;

(d) computing a code in response to generation of said signal for designating the setting of said machine with respect to said reference point;

(e) comparing said computed code with a predetermined code corresponding to said predetermined setting to which said machine is to be adjusted;

(f) adjusting said machine whereby said linearly moving element is moved, moving said linkage;

(g) generating an electric signal in response to movement of said linkage;

(h) recomputing said computed code in response to generation of said signal for designating an adjusted setting of said machine with respect to said reference point;

(i) comparing said recomputed code with said predetermined code; and (j) if said recomputed code differs from said predetermined code, repeating steps (f) through (i).

* * * * *